(12) United States Patent
Endres et al.

(10) Patent No.: US 7,850,896 B2
(45) Date of Patent: Dec. 14, 2010

(54) METHOD OF PRODUCING A FOLDED HONEYCOMB STRUCTURE FOR A SANDWICH COMPONENT AND FOLDABLE SHEET-LIKE MATERIAL

(75) Inventors: Gregor Christian Endres, Pfaffenhofen (DE); Hans-Juergen Weber, Verden (DE)

(73) Assignee: AIRBUS Deutschland GmbH, Hamburg (DE)

( * ) Notice: Subject to any disclaimer, the term of this patent is extended or adjusted under 35 U.S.C. 154(b) by 447 days.

(21) Appl. No.: 11/998,439

(22) Filed: Nov. 29, 2007

(65) Prior Publication Data

US 2009/0104411 A1 Apr. 23, 2009

Related U.S. Application Data

(60) Provisional application No. 60/861,573, filed on Nov. 29, 2006.

(51) Int. Cl.
*B32B 3/12* (2006.01)
*H05B 7/02* (2006.01)

(52) U.S. Cl. ............... 264/449; 428/116; 428/36.3; 428/195.1; 264/451; 264/319; 264/322; 264/330

(58) Field of Classification Search .................. None
See application file for complete search history.

(56) References Cited

U.S. PATENT DOCUMENTS

| 4,677,012 A | * | 6/1987 | Anderson | ........... 428/116 |
| 6,720,060 B1 | * | 4/2004 | Swars | ........... 428/116 |
| 2008/0075916 A1 | * | 3/2008 | Bradford | ........... 428/116 |

* cited by examiner

*Primary Examiner*—Ling Xu
(74) *Attorney, Agent, or Firm*—Maginot, Moore & Beck

(57) ABSTRACT

In a method of producing a folded honeycomb structure for a sandwich component a sheet-like material is provided. The sheet-like material comprises a softening temperature and is heated to at least the softening temperature in a region about predetermined folding lines. Then, the sheet-like material is folded along the heated region of the folding lines into the folded honeycomb structure.

11 Claims, 4 Drawing Sheets

METHOD OF PRODUCING A FOLDED HONEYCOMB STRUCTURE FOR A SANDWICH COMPONENT AND FOLDABLE SHEET-LIKE MATERIAL

This application claims the benefit of U.S. Provisional Patent Application Ser. No. 60/861,573, filed Nov. 29, 2006.

BACKGROUND OF THE INVENTION

The present invention relates to a method of producing a folded honeycomb structure for a sandwich component and to a foldable sheet-like material.

Although it can be applied to any desired folded structures, the present invention and the problem on which it is based are explained in more detail with reference to folded core structures for sandwich components in aircraft construction.

On account of their good ratio of stiffness and strength to density, composite materials, and in particular so-called sandwich components, have a wide range of applications in the area of aircraft construction.

Sandwich components generally have an upper and a lower outer layer, between which there is, for example, a core structure of vertically running cells of hexagonal cross section, to increase the stiffness.

Another variant of a core structure that is suitable in particular for use in double-shell aircraft fuselages comprises core structures folded from planar semifinished materials. One particular advantage of these structures is that a core that is lightweight, resists buckling, allows drainage, insulates sound and is adapted to the mechanical loads can be folded for a sandwich component, even continuously, from all planar foldable materials with low energy expenditure and with repeating patterns.

The production process for folded honeycomb structures must be performed with adequate accuracy to make it possible for later processing to be carried out without any problems. Apart from the precision that is required, cost-effective production is a second important criterion. In the case of various conventional methods, a sheet-like material to be folded is brought into the desired folded form by male dies or by embedding it between membranes provided with shape-imparting bracing elements. Other methods envisage a pre-treatment to weaken the sheet-like material along the desired folding lines. A common characteristic of these methods is that the folded honeycomb structures do not have adequate inherent stability after the folding process, so that it is necessary to support the folded honeycomb structures mechanically by means of fitting moulds, mounts and the like during further method steps, such as for example stabilization by coating or impregnating with resin and subsequent heat treatment for curing. This leads to high production costs and makes it more difficult in particular to produce folded honeycombs in a continuous process.

SUMMARY OF THE INVENTION

It is an object of the present invention to provide a production method for folded honeycomb structures which makes low production costs possible along with a high dimensional accuracy of the folded honeycomb structure, and in particular makes continuous production of the folded honeycomb structures possible.

The object of the invention is achieved by means of a method of producing a folded honeycomb structure for a sandwich component, comprising the steps of: providing a sheet-like material which comprises a softening temperature; locally heating the sheet-like material to at least the softening temperature in a region about predetermined folding lines; and folding the sheet-like material along the heated region of the folding lines into the folded honeycomb structure.

The idea on which the present invention is based is that a planar sheet-like material that is to be folded along predetermined folding lines is heated locally in the region of the folding lines, in order in this way to create along the desired folding edges locally softened zones which act in the manner of hinges between the non-softened sheet-like portions delimited by the folding lines, and consequently allow the folded honeycomb structure to be folded into the desired form with minimal mechanical guidance. A sheet-like material which has a softening temperature is provided for this purpose, i.e. a material which softens when it is heated to or above a certain temperature, the softening temperature of the material. The local heating is performed in such a way that, during the folding operation, the local temperature of the sheet-like material in the region of the folding lines is equal to or higher than the softening temperature of the sheet-like material, but the local temperature of the sheet-like material in the sheet-like regions delimited by the folding lines is below the softening temperature of the sheet-like material.

In a further aspect, the invention provides a foldable sheet-like material comprising a fibrous material, in particular for use in the method provided, electrical interconnects running on or below a surface of the sheet-like material. The interconnects are arranged in such a way that, when the sheet-like material is folded along the interconnects, a folded honeycomb structure extending in a third dimension is obtained from the two-dimensional initial form of the sheet-like material.

The folded honeycomb structure folded from the locally heated sheet-like material may be cooled to below the softening temperature. As a result, the softening in the region of the folding edges of the folded honeycomb structure resulting from the folding lines is reversed, so that the folded honeycomb structure is stabilized. In particular, it is made possible during further processing of the folded honeycomb structure to dispense with mechanical support or to remove mechanical guidance, that may be used for the folding, after the cooling. This consequently considerably simplified further processing makes it possible to lower the production costs of the core structure.

The local heating in the region of the folding lines may be realized by means of electrical interconnects, which are formed along the predetermined folding lines in or on the sheet-like material. This takes place during the provision of the sheet-like material. In order to bring about the desired local softening of the sheet-like material to initiate the folding operation, electric current is passed through the interconnects. The fact that the interconnects are formed on the planar sheet-like material allows low-cost and precise methods to be used for this.

The electrical interconnects may be created in or on the sheet-like material by printing with an electrically conductive substance. Similar printing methods are used in other areas of technology, such as for example production of printed circuit boards in electronics or of rear window heating systems in motor vehicle technology, so that it is possible to rely on the use of corresponding techniques in a low-cost way. This development makes it possible in a particularly advantageous way to form interconnects in sheet-like materials with a smooth surface. The printing is preferably performed with an electrically conductive paste, such as for example a silver paste.

The electrical interconnects may be formed by incorporating electrically conductive filaments in the sheet-like material. This development makes it possible in a particularly advantageous way to form interconnects in sheet-like materials that comprise a loose fibrous structure, such as a woven fabric or a laid fiber fabric, or do not have a surface suitable for printing. The conductive filaments are preferably carbon filaments, since they are very inexpensive and have a suitable electrical resistivity.

The sheet-like material may be provided on the basis of a thin semifinished fibrous material stretched out in the manner of a sheet, which is impregnated or coated with a resin, such as for example phenolic resin. The resultant fiber composite material with resin matrix lends the folded honeycomb structure particularly great stability. At the same time, it is made possible to increase the mechanical cohesion of the folding lines acting as hinges in the heated state, since the fibrous material and resin can be expediently chosen such that only the resin matrix softens, while the fibrous material retains its tensile strength unchanged.

The forming of the electrical interconnects may take place in this case before the impregnating or coating of the semifinished fibrous material. This has the advantage that the interconnect comes to lie in the interior of the resin matrix, is therefore well protected and can heat the sheet-like material uniformly towards both sides in the region of the folding lines. Furthermore, it is advantageously made possible, for example when a paper is used as the fibrous material, to use its particularly easy printability and so to use particularly low-cost printing methods, such as for example rotary printing.

Partial crosslinking of the resin may also take place by means of a heat treatment of the impregnated or coated semifinished fibrous material, whereby the sheet-like material is provided as a thermosetting system in a partially crosslinked state. The crosslinking has the effect of increasing the stability of the sheet-like material to the extent that the regions that are not locally heated during the folding operation can set themselves up between the softened folding lines without mechanical support, for example by means of a mould. At the same time, the crosslinking ensures that the resin on the surface of the sheet-like material is no longer tacky. Both effects make particularly simple and low-cost production of the folded honeycomb structure possible.

The fact that the crosslinking only takes place partially means that, on the other hand, it remains possible to soften the sheet-like material as a thermosetting system in the partially crosslinked state again by heating it to a temperature above a softening temperature. The stability and softening temperature depend in this case on the degree of crosslinking, which can be set according to the requirements of the production process. The partial crosslinking of the resin preferably takes place up to a degree of crosslinking of 50%-60%.

The folded honeycomb structure produced from the sheet-like material may be subjected to a second heat treatment, during which the degree of crosslinking of the resin is further increased. Preferably, substantially complete crosslinking with a degree of crosslinking of almost 100% is achieved here. This is advantageous, since maximum stability of the thermosetting system is achieved in this way.

In the case of typical thermosetting systems, apart from the degree of crosslinking, the softening temperature characterizing the system also increases during the heat treatment. Preferably, in the second heat treatment, the temperature of the folded sheet-like material is always kept below the current softening temperature of the folded sheet-like material. This prevents the folded honeycomb structure from softening at the folding edges or in other regions, which makes it possible to prevent unfolding or deforming of the folded honeycomb structure during the heat treatment, without mechanical support of the folded form being required. This is particularly advantageous, since a much simplified production process is made possible.

BRIEF DESCRIPTION OF THE DRAWINGS

The invention is explained in more detail below on the basis of exemplary embodiments with reference to the accompanying figures of the drawing, in which.

DETAILED DESCRIPTION OF THE INVENTION

Figure 1A:
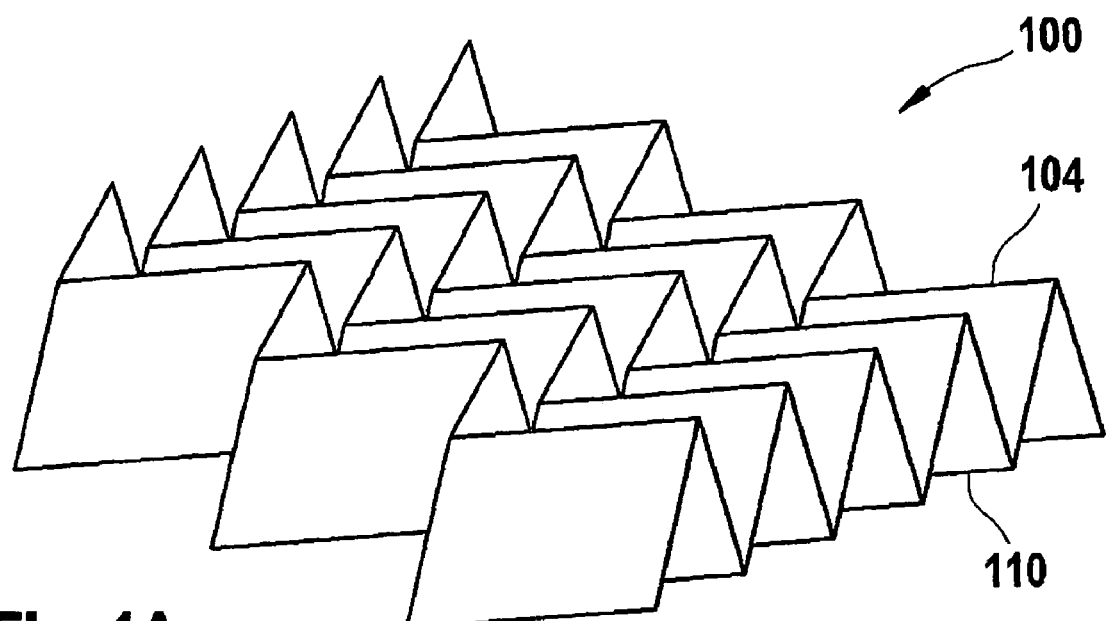
FIG. 1A is a perspective oblique view of an example of a folded honeycomb structure for a sandwich component.

In the figures, the same reference numerals designate components that are the same or functionally the same, unless otherwise indicated.

FIG. 1A shows in a perspective oblique view an example of a folded honeycomb structure such as that used in the production of sandwich components. The folded honeycomb structure shown has folding edges 104, 110, which result from the folding lines during the folding of a planar starting material along predetermined folding lines. Upper folding edges 104, which run in a zigzag form and can be seen on the upper side of the folded honeycomb structure in the representation, define in the folded state an imaginary upper delimiting plane of the folded honeycomb structure, while lower folding edges 110, running correspondingly in a zigzag form on the underside of the folded honeycomb structure, define an imaginary lower delimiting plane parallel to the upper delimiting plane. The folding edges of folded honeycomb structures for sandwich components may, however, also be defined in other delimiting surface areas, formed in principle in any desired way, such as for example planes sloping towards each other in the manner of a wedge, curved surface areas or irregularly shaped surface areas.

Figure 1B:
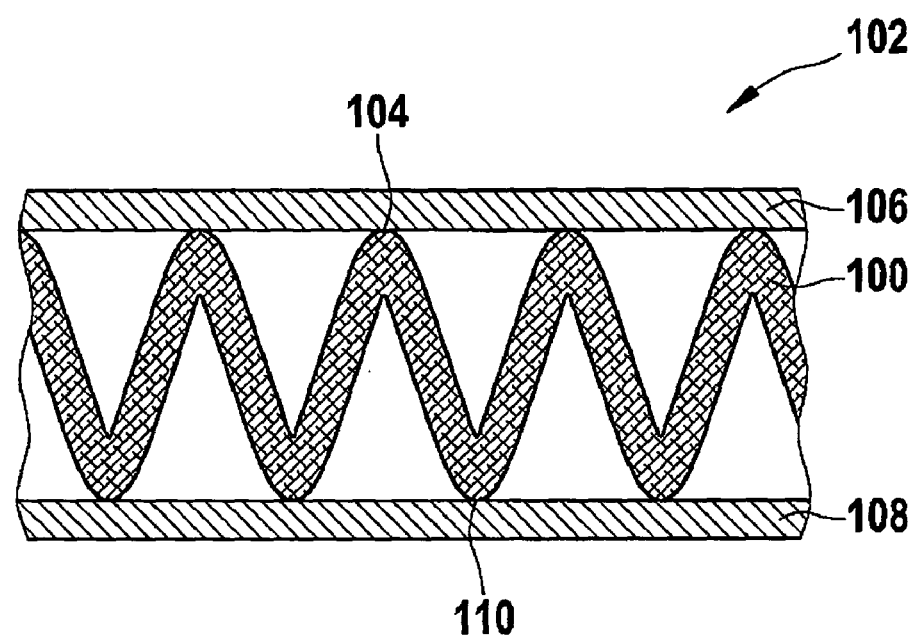
FIG. 1B is a cross-sectional view of a sandwich component with the folded honeycomb structure from FIG. 1A.

FIG. 1B shows in a cross-sectional view a sandwich component 102, which comprises a folded honeycomb structure 100 such as that shown in FIG. 1A. The folded honeycomb structure 100 is enclosed between an upper outer layer 106 and a lower outer layer 108, the upper folding edges 104 being fastened to the upper outer layer 106 and the lower folding edges 110 being fastened to the lower outer layer 108.

Figure 2:
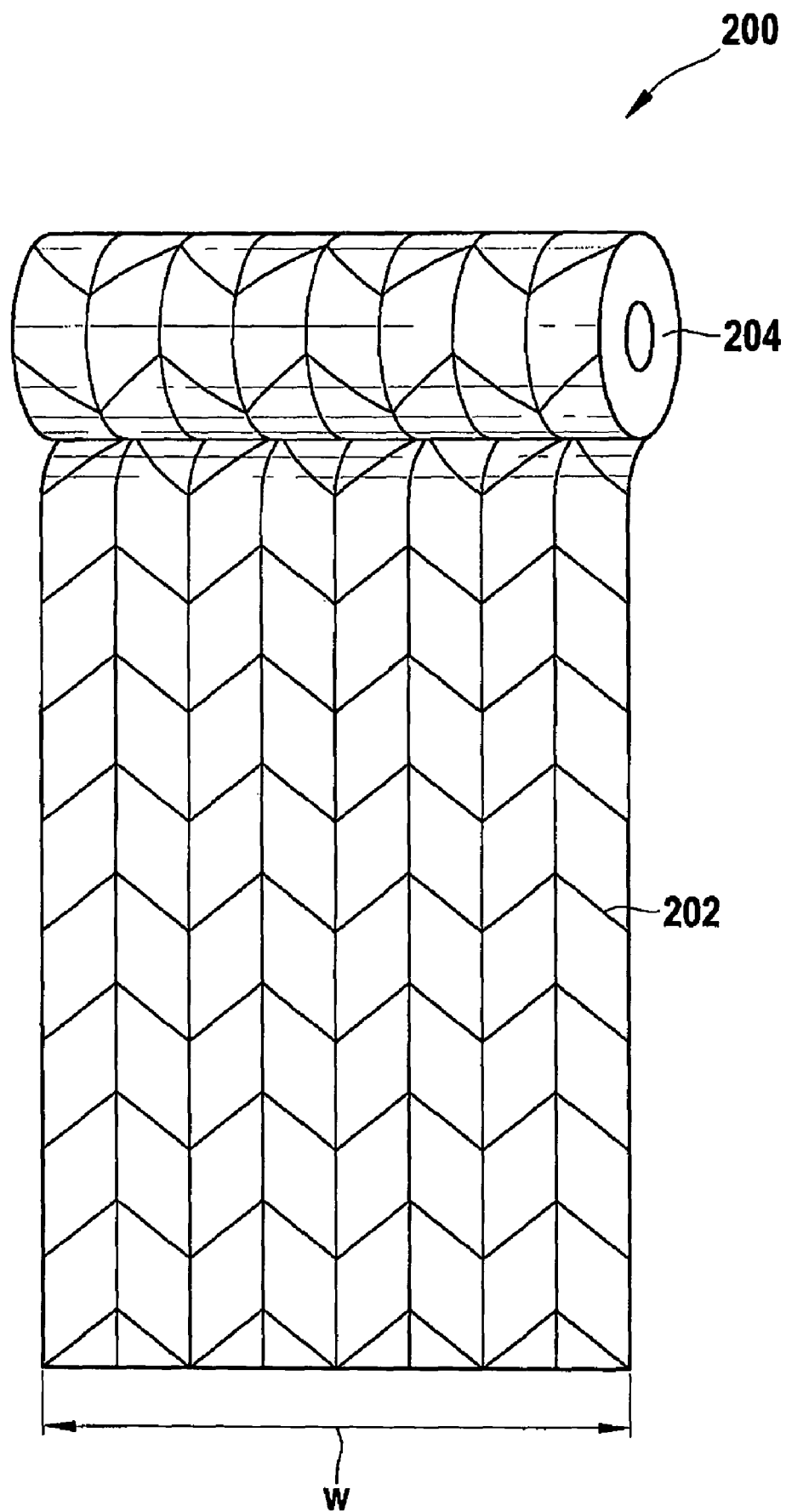
FIG. 2 is a plan view of a foldable sheet-like material according to one embodiment of the invention, for the production of the folded honeycomb structure in FIG. 1A.

FIG. 2 shows a plan view of a foldable sheet-like material 200, which according to one embodiment of the invention is used for the production of a folded honeycomb structure such as that shown in FIG. 1A. The sheet-like material takes the form of a web of a defined width w and an undefined length wound onto a roll 204, which makes it possible for a folded honeycomb structure of a likewise defined width and undefined length to be produced in a continuous process. Alternatively, individual sheets of the sheet-like material 200 of a defined length and width may also be used, for example in a discontinuous production process for folded honeycomb structures of a likewise defined length and width.

A pattern of electrical interconnects 202, which run along predetermined folding lines at which it is intended to fold the sheet-like material to form the folded honeycomb structure, can be seen on the sheet-like material 200.

Figure 3A:
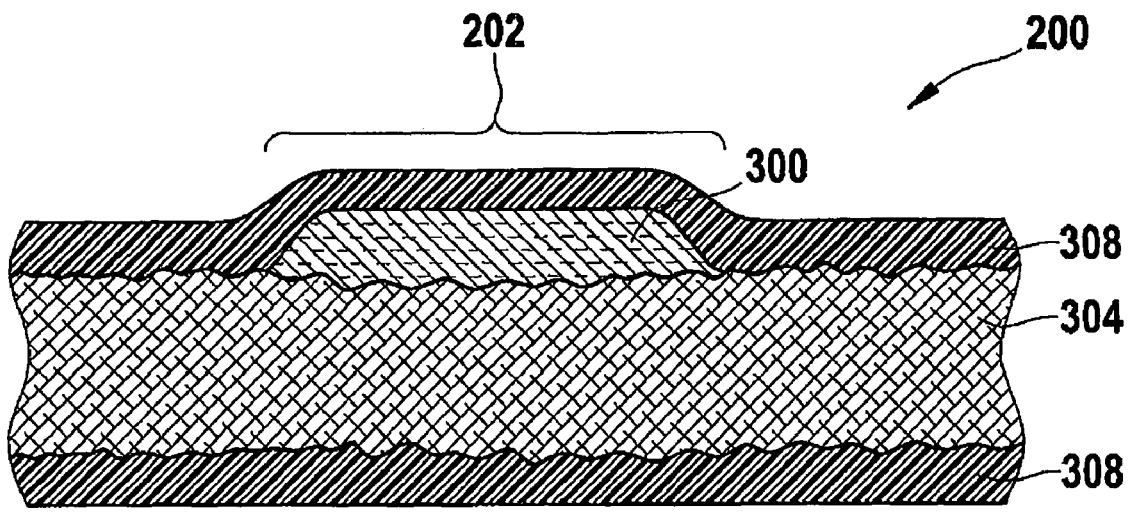
FIG. 3A is a cross-sectional view of a detail of the sheet-like material from FIG. 2.

FIG. 3A shows a cross-sectional view of a detail of the sheet-like material from FIG. 2, on the basis of which the composition and structure of the sheet-like material are to be explained. The core of the sheet-like material 200 is formed by a fibrous material 304 stretched out in the manner of a sheet, such as for example a paper based on aramid fibers. Applied to a surface of the paper is an electrically conductive substance 300, such as for example a conductive paste, which forms the interconnect 202, shown here in cross section.

To increase the stability, the paper is coated or impregnated with a resin 308, such as for example phenolic resin, so that the paper is embedded in a matrix of resin. As a result of subsequent heat treatment, the resin matrix is in a partially cross-linked state, whereby the stability and stiffness of the sheet-like material are further increased. Since the crosslinking is incomplete, however, the sheet-like material has a softening temperature, i.e. it is possible to bring the sheet-like material into a soft, deformable state again by specific heating to at least the softening temperature.

Figure 3B:
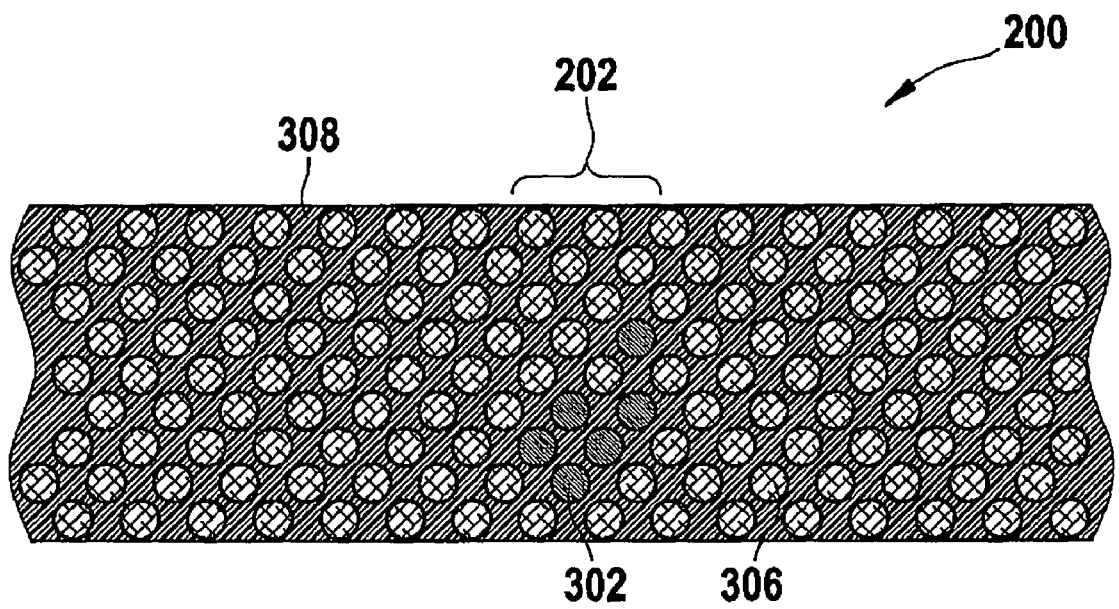
FIG. 3B is a cross-sectional view of a detail of a foldable sheet-like material according to a further embodiment of the invention.

FIG. 3B shows a cross-sectional view of a detail of a foldable sheet-like material according to a further, alternative embodiment of the invention. Instead of a paper, a laid or woven fabric of fibers 306, for example aramid fibers or glass fibers, which are embedded in a partially crosslinked resin matrix 308, is used here as the fibrous material.

The interconnect 202 that is shown is formed here by incorporated, electrically conductive fibers, such as for example carbon fibers 202. The various features of the embodiments from FIG. 3A and FIG. 3B can also be differently combined. For example, the carbon fibers 302 may also lie on the surface of the fibrous material and/or be used together with the paper shown in FIG. 3A.

Figure 4:
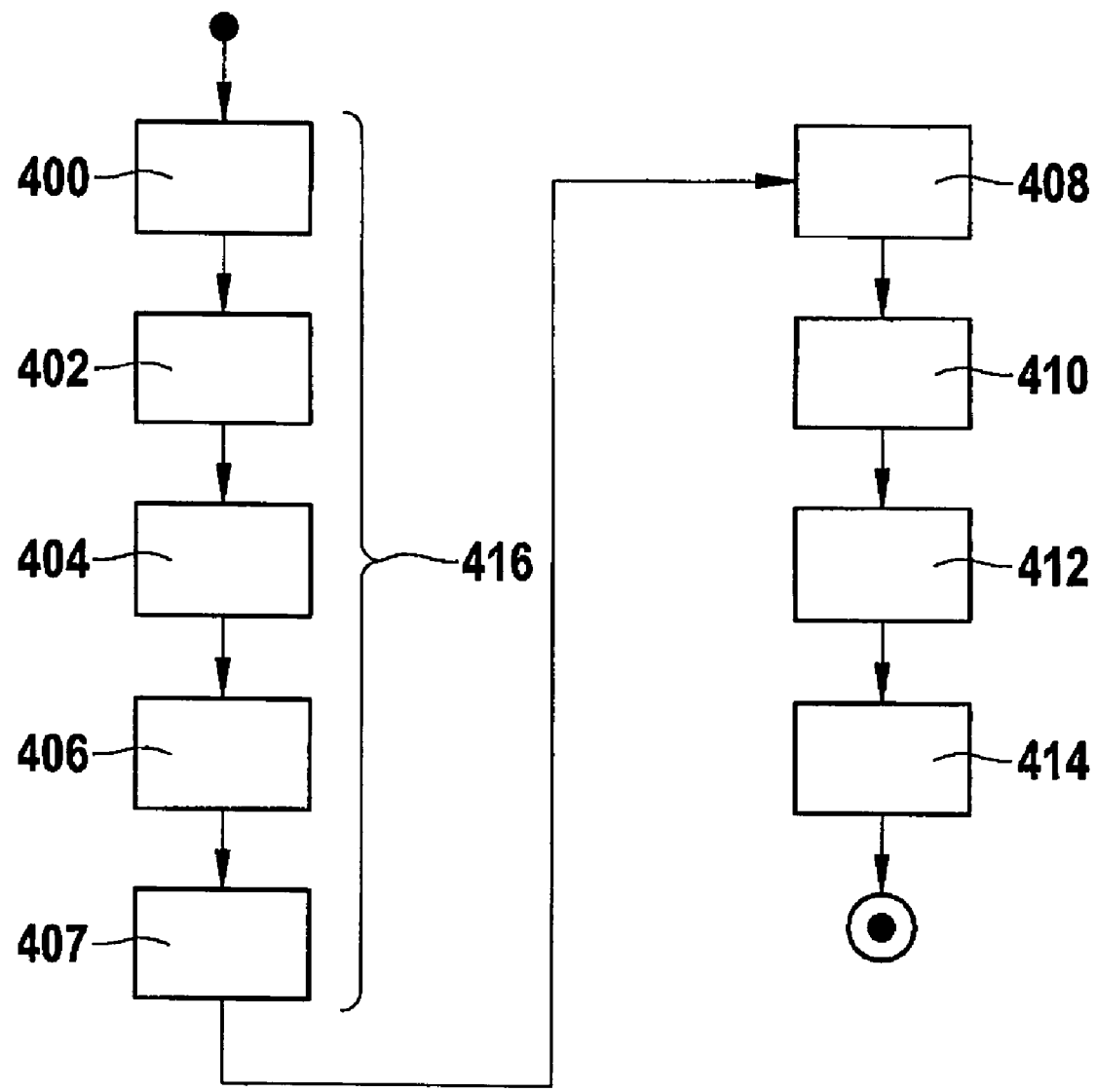
FIG. 4 is a flow diagram of a method of producing a folded honeycomb structure according to one embodiment of the invention.

FIG. 4 shows a flow diagram of a method of producing a folded honeycomb structure according to one embodiment of the invention. The method shown comprises nine steps 400-414, of which the first five steps 400-407 serve for the provision 416 of a sheet-like material, such as that shown, for example, in FIGS. 2 to 3A and explained above.

For the provision 416 of the sheet-like material, firstly, in step 400, a thin fibrous semifinished material stretched out in the manner of a sheet is provided, to be assumed in the embodiment described by way of example here as an aramid fiber paper, such as for example Kevlar®/N636 or Kevlar®/N637.

With steps 402 and 404, electrical interconnects are formed on the surface of the paper in such a way that they follow the path of predetermined folding lines at which the sheet-like material is to be folded to form the folded honeycomb structure. For this purpose, firstly, in step 402, the paper is printed with a conductive paste in the region of the intended interconnects. Suitable pastes are used, for example, in the production of printed circuit boards and usually comprise a metal component and a binder component. The printing may be performed by screen printing, rotary printing and other suitable methods.

Since, with conductive pastes that are usually used, firing is required, in step 404 the conductive paste is fired by heating the printed semifinished fibrous material to the required firing temperature. Expediently, the conductive paste used in step 402 is chosen such that the firing temperature is lower than the limit temperature tolerated as a maximum by the paper, for example lower than 250° C.

In step 406, the paper is coated with phenolic resin, which may be performed, for example, by immersion or coating. As a result, the stiffness of the paper increases. In step 407, partial crosslinking of the phenolic resin takes place by means of a first heat treatment of the coated paper. As a result, the stiffness of the paper increases further. At the same time, the surface of the paper coated with resin loses its tackiness, which facilitates the further processing. The duration and temperature of the heat treatment are chosen such that a degree of crosslinking with the desired characteristics is obtained (for example 50%-60%), but at the same time it remains possible to soften the sheet-like material again by specific heating to or above its softening temperature.

This completes the provision 416 of the sheet-like material. The following steps may follow on immediately, for example in the form of a continuous production process. On the other hand, it is possible to produce the sheet-like material in the way described at one location and bring it to another location for carrying out the steps that follow, for example as a stack of individual sheets or else in the form of rolled-up webs of undefined length.

In step 408, electric current is passed through the interconnects of the sheet-like material, so that the latter is heated in a limited region at and around the interconnects. For this purpose, the interconnects may, for example, be contacted at the edge of the paper by metal brushes, clamps or needles, which possibly penetrate through the outer layer of the paper if the interconnects run inside the sheet-like material. The intensity and variation over time of the electric current are expediently chosen such that a defined softening of the sheet-like material is obtained in the direct vicinity of the interconnects by heating to at least the softening temperature.

In step 410, folding of the sheet-like material is initiated, for example by the action of lateral forces. Since the temperature of the sheet-like material in the sheet-like regions between the interconnects lies below the softening temperature, the sheet-like material remains stiff in these regions, while it is softened in the linear regions around the interconnects. As a result, the regions around the interconnects act like hinges, so that the folding geometry is predetermined and, given appropriate guidance, the sheet-like material can be easily folded into the folded honeycomb structure.

In step 412, the electric current is switched off, while the folded honeycomb structure is kept in the folded form by suitable guidance. After that, the regions around the interconnects cool to a temperature below the softening temperature. The regions around the interconnects consequently lose their hinge effect and stabilize the folded honeycomb to the extent that the guidance can be removed.

In step 414, the folded honeycomb structure stabilized in this way is subjected as a whole to a second heat treatment, for example by introducing it into a furnace. During the heat treatment, the temperature is always kept below the softening temperature of the material of the folded honeycomb structure, to avoid the folded honeycomb structure softening and unfolding again in the absence of guidance. As a result of the heat treatment, the phenolic resin matrix of the folded honeycomb structure gradually crosslinks, whereby the softening temperature at the same time continuously rises. To complete the heat treatment as quickly as possible, it is therefore expedient always to leave the temperature in the furnace just below the softening temperature and to increase it continuously with the latter. This can take place, for example, in a tunnel furnace with a temperature profile rising towards the outlet, through which the folded honeycomb structure is passed.

Although the present invention has been described here on the basis of preferred exemplary embodiments, it is not restricted to these but can be modified in various ways.

For example, it is possible to provide interconnects of the type described on thermoplastic materials, the thermoplastic materials being stabilized by cooling of the locally heated regions.

Other composite materials, including carbon fiber-reinforced plastics, may also be used. Given appropriate insulation, interconnects may also be formed in or on electrically conductive sheet-like materials.

The local heating along the folding lines may be brought about by other means, such as for example irradiation with laser light, or physical contact with a contact area, for example a foil or roller in which the electrical interconnects are recessed, that has been heated inhomogeneously in a corresponding pattern.

Although modifications and changes may be suggested by those skilled in the art, it is the intention of the inventors to embody within the patent warranted hereon all changes and modifications as reasonably and properly come within the scope of their contribution to the art.

The invention claimed is:

1. A method of producing a folded honeycomb structure for a sandwich component, comprising the steps of:
    providing a sheet-like material which comprises a softening temperature;
    locally heating the sheet-like material to at least the softening temperature in a region about predetermined folding lines; and
    folding the sheet-like material along the heated region of the folding lines into the folded honeycomb structure.

2. The method of claim 1, further comprising cooling the folded honeycomb structure below the softening temperature.

3. The method of claim 1, wherein providing the sheet-like material comprises forming electrical interconnects in or on the sheet-like material along the predetermined folding lines; the local heating being performed by means of passing an electric current through the interconnects.

4. The method of claim 3, wherein forming the electrical interconnects comprises at least one of
    printing an electrically conductive substance or an electrically conductive paste in or on the sheet-like material along the predetermined folding lines; or
    comprises incorporating electrically conductive filaments or carbon filaments in the sheet-like material.

5. The method of claim 3, wherein providing the sheet-like material comprises providing a thin semi-finished fibrous material stretched out in the manner of a sheet, and impregnating or coating the semi-finished fibrous material with a resin.

6. The method of claim 5, wherein forming the electrical interconnects is performed before impregnating or coating the semi-finished fibrous material.

7. The method of claim 5, wherein providing the sheet-like material comprises partially cross-linking the resin by means of a first heat treatment of the impregnated or coated semi-finished fibrous material.

8. The method of claim 7, wherein the partially cross-linking of the resin results in a degree of cross-linking up to 50%-60%.

9. The method of claim 8, further comprising substantially completely cross-linking the resin by means of a second heat treatment of the folded honeycomb structure.

10. The method of claim 9, wherein during the second heat treatment, as a softening temperature of the folded honeycomb structure rises with increasing temperature, the temperature of the folded honeycomb structure is increased continuously with the rising softening temperature while keeping the temperature of the folded honeycomb structure below the rising softening temperature of the folded honeycomb structure.

11. A foldable sheet-like material, comprising:
    a fibrous material and
    electrical interconnects formed on or below a surface of the fibrous material; the interconnects being arranged in such a way that, when the fibrous material is folded along the interconnects, a honeycomb structure extending in a third dimension is obtained from the two-dimensional initial form of the fibrous material, the electrical interconnects being present in the honeycomb structure.

* * * * *